United States Patent
Pistoia et al.

(10) Patent No.: US 12,217,329 B2
(45) Date of Patent: Feb. 4, 2025

(54) SYSTEMS AND METHODS FOR DYNAMIC DETECTION AND PRESENTATION OF OBSCURED REAL-WORLD OBJECTS IN AUGMENTED OR MIXED REALITY VIRTUAL CONTENT

(71) Applicant: JPMORGAN CHASE BANK, N.A., New York, NY (US)

(72) Inventors: Marco Pistoia, Amawalk, NY (US); Bill Moriarty, West Chester, PA (US); Shaohan Hu, Yorktown Heights, NY (US); Hargun Kalsi, Monmouth Junction, NJ (US); Aniella Arantes, Jersey City, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 248 days.

(21) Appl. No.: 17/497,519

(22) Filed: Oct. 8, 2021

(65) Prior Publication Data

US 2023/0113125 A1    Apr. 13, 2023

(51) Int. Cl.
  *G06T 11/00*   (2006.01)
  *G01S 17/89*   (2020.01)
(52) U.S. Cl.
  CPC .............. *G06T 11/00* (2013.01); *G01S 17/89* (2013.01)

(58) Field of Classification Search
  None
  See application file for complete search history.

(56) References Cited

U.S. PATENT DOCUMENTS

| | | | |
|---|---|---|---|
| 2015/0277119 A1* | 10/2015 | Wong | G06F 3/0482 345/633 |
| 2018/0276969 A1* | 9/2018 | Obaidi | G06V 20/20 |
| 2022/0244835 A1* | 8/2022 | Faulkner | G06F 3/04815 |
| 2023/0018309 A1* | 1/2023 | Berliner | G06F 3/012 |
| 2023/0186578 A1* | 6/2023 | Faulkner | G06V 20/41 345/633 |

* cited by examiner

*Primary Examiner* — Yi Wang
(74) *Attorney, Agent, or Firm* — GREENBERG TRAURIG LLP

(57) ABSTRACT

A method for dynamic detection and presentation of obscured real-world objects in augmented or mixed reality virtual content may include an object of interest computer program executed by an electronic device: (1) receiving data for a virtual or augmented reality object to display on an image of a physical environment on a display of the electronic device; (2) receiving data for a physical object in the physical environment; (3) determining that the physical object is obscured by the virtual or augmented reality object; (4) generating a representation of the physical object; and (5) providing the representation of the physical object to a virtual reality or augmented reality computer program executed by the electronic device, wherein the virtual reality or augmented reality computer program is configured to display the physical object over the virtual or augmented reality object.

20 Claims, 2 Drawing Sheets

SYSTEMS AND METHODS FOR DYNAMIC DETECTION AND PRESENTATION OF OBSCURED REAL-WORLD OBJECTS IN AUGMENTED OR MIXED REALITY VIRTUAL CONTENT

BACKGROUND OF THE INVENTION

1. Field of the Invention

Embodiments relate generally to systems and methods for dynamic detection and presentation of obscured real-world objects in augmented or mixed reality virtual content.

2. Description of the Related Art

A physical device such as a HoloLens, an iPad, an iPhone, headsets, etc. or similar can display augmented or virtual reality content on its screen. This virtual content, however, can partially or completely obscure part of the real-world environment, including objects that could cause harm to the user, objects that the user should see, etc. For example, in one scenario, if an augmented reality interior design application places a virtual rug on the real world floor, and that virtual rug obscures a descending staircase, the user may walk forward, unaware of the staircase, and accidentally fall down the stairs because they were obscured by the virtual rug. In another scenario, if an augmented reality mapping application, or way finding application, is displaying virtual content such as turn by turn navigation arrows, virtual way finding text, or virtual way finding signs, these pieces of virtual content may obscure real world environment information such as a physical stop sign, or a physical Do Not Cross sign at a crosswalk. A user may then walk into a street when the crosswalk sign says Do Not Cross because this sign was obscure7d by virtual content, a user may not stop at the stop sign because the sign was obscured by virtual content, etc.

SUMMARY OF THE INVENTION

Systems and methods for dynamic detection and presentation of obscured real-world objects in augmented or mixed reality virtual content are disclosed. According to one embodiment, a method for dynamic detection and presentation of obscured real-world objects in augmented or mixed reality virtual content may include: (1) receiving, by an object of interest compute7r program executed by an electronic device, data for a virtual or augmented reality object to display on an image of a physical environment on a display of the electronic device; (2) receiving, by the object of interest computer program, data for a physical object in the physical environment; (3) determining, by the object of interest computer program, that the physical object is at least partially obscured by the virtual or augmented reality object; (4) generating, by the object of interest computer program, a representation of the physical object; and (5) providing, by the object of interest computer program, the representation of the physical object to a virtual reality or augmented reality computer program executed by the electronic device, wherein the virtual reality or augmented reality computer program is configured to display the physical object over the virtual or augmented reality object.

In one embodiment, the object of interest computer program may receive the virtual or augmented reality object from the virtual reality or augmented reality computer program.

In one embodiment, the method may further include determining, by the object of interest computer program, that the physical object is an obje7ct of interest. The object of interest may include a dangerous, hazardous, or harmful object.

In one embodiment, the step of determining, by the object of interest computer program, that the physical object is at least partially obscured by the virtual or augmented reality object may include: determining a location of the physical object and a location of the virtual or augmented reality object and determining that the location of the virtual or augmented reality object is between the electronic device and the physical object.

7In one embodiment, the object of interest computer program may determine a location of the physical object using a ray cast query. The location may be determined by LiDAR.

In one embodiment, the representation of the physical object comprises an image of the physical object.

According to another embodiment, a method for dynamic detection and presentation of obscured real-world objects in augmented or mixed reality virtual content may include: (1) receiving, by an object of interest computer program executed by an electronic device, data for a virtual or augmented reality object to display on an image of a physical environment on a display of the electronic device; (2) receiving, by the object of interest computer program, data for a physical object in the physical environment; (3) determining, by the object of interest computer program, that the physical object is at least partially obscured by the virtual or augmented reality object; (4) detecting, by the object of interest computer program, a boundary of the physical object; and (5) providing, by 7the object of interest computer program, to a virtual reality or augmented reality computer program executed by the electronic device, wherein the virtual reality or augmented reality computer program is configured to remove an area within the boundary from the virtual or augmented reality object, wherein the physical object is visible in the area of the virtual or augmented reality object.

In one embodiment, the object of interest computer program may receive the virtual or augmented reality object from the virtual reality or augmented reality computer program.

In one embodiment, the method may further include determining, by the object of interest computer program, that the physical object is an object of interest. The7 object of interest may include a dangerous, hazardous, or harmful object.

In one embodiment, the step of determining, by the object of interest computer program, that the physical object is at least partially obscured by the virtual or augmented reality object may include: determining a location of the physical object and a location of the virtual or augmented reality object and determining that the location of the virtual or augmented reality object is between the electronic device and the physical object.

In one embodiment, the object of interest computer program may determine a location of the physical object using a ray cast query. The location of the object of interest may be determined using LiDAR.

According to another embodiment, an electronic device may include a display, an object of interest computer program, and a computer processor. When executed by the computer processor, the object of interest computer program may cause the computer processor to: receive data for a virtual or augmented reality object to display on an image of a physical environment on the display of the electronic device; receive data for a physical object in the physical environment; determine that the physical object is at least partially obscured by the virtual or augmented reality object; generate a representation of the physical object; and provide the representation of the physical object to a virtual reality or augmented reality computer program executed by the electronic device, wherein the virtual reality or augmented reality computer program is configured to display the physical object over the virtual or augmented reality object.

In one embodiment, the object of interest computer program may cause the computer processor to receive the virtual or augmented reality object from the virtual reality or augmented reality computer program.

In one embodiment, the object of interest may include a dangerous, hazardous, or harmful object.

In one embodiment, the object of interest computer program may cause the computer processor determine that the physical object is at least partially obscured by the virtual or augmented reality object by determining a location of the physical object and a location of the virtual or augmented reality object and determining that the location of the virtual or augmented reality object is between the electronic device and the physical object.

In one embodiment, the location of the physical object may be determined using a ray cast query.

In one embodiment, the electronic device may include a LiDAR transceiver, and the location of the physical object may be determined using LiDAR from the LiDAR transceiver.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Figure 1:
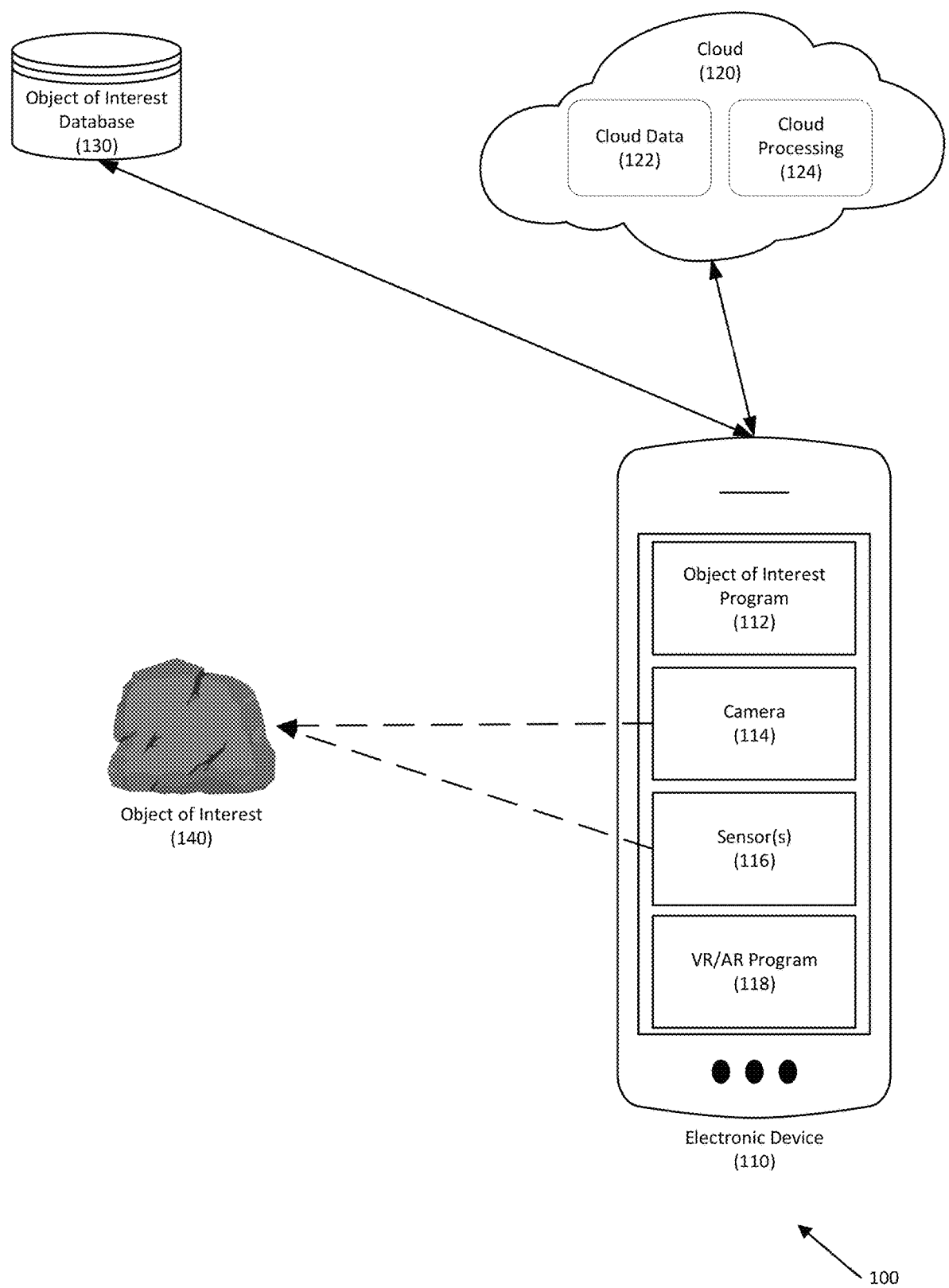
FIG. 1 is a depicts a system for dynamic detection and presentation of obscured real-world objects in augmented or mixed reality virtual content according to an embodiment.

Embodiments relate generally to systems and methods for dynamic detection and presentation of obscured real-world objects in augmented or mixed reality virtual content.

Embodiments may provide a software layer that may use an electronic device's cameras and machine learning models to map and detect information about the user's real-world physical environment. Embodiments may track objects and their location that are deemed to be of interest (e.g., a dangerous or harmful object, an important object, etc.) to the user.

When an augmented or virtual reality application identifies virtual content to present in the display of a user electronic device, the virtual content may first be passed to a software layer that may modify the virtual content and return that modified virtual content to the calling software or to the display.

Embodiments may modify the virtual content as follows. If an augmented reality application intends to display virtual content that will at least partially obscure an object of interest (e.g., a dangerous, hazardous, or harmful object, an important object, etc.), embodiments may detect the boundaries of the object of interest, and the bounded real world object of interest, including the area within the boundaries, may be removed from the rendering of the virtual content and/or the virtual content. Thus, the virtual content is modified so that the object of interest is not obscured by the virtual content. The virtual content may be modified in real-time.

In another embodiment, an augmented reality application intends to display virtual content that will at least partially obscure an object of interest (e.g., a dangerous, hazardous, or harmful object, an important object, etc.), embodiments may detect the boundaries of the object of interest to not obscure including the area within the boundaries. Embodiments may capture an image of the bounded object, and the image may be overlaid on the virtual content, mapped it to the same area in the image so that the position of the cropped image maps to the location of the object of interest. In this way, the virtual content is not modified; instead, a layer is added on top of the virtual content.

For example, an augmented reality tree may be blocking a real-world stop sign. The augmented reality device may capture an image of the stop sign, may extract the stop sign from the image, and may overlay the stop sign as the top layer on the screen so that the stop sign can be seen. The position of the stop sign may accurately represent the real-world position of the stop sign.

In another embodiment, location sensing-technology, such as Light Detection and Ranging (LiDAR) technology, sound navigation and ranging (sonar), etc. may be used to map and create a three-dimensional model of the object of interest in real time. The three-dimensional model of the object of interest may be place in the virtual content (e.g., in the virtual environment) so that it is displayed in the same position in the virtual content that it exists in the real world.

In embodiments, the object of interest may be visually highlighted. The object of interest may be highlighted in several ways, and with several indicators denoting the importance or potential danger to the user. For example, in one embodiment, the boundaries of the object of interest may be "padded" to put some unnatural outline of color between the object of interest and the virtual content. In another embodiment, the boundaries and area within the object of interest may be overlaid with a color to the boundaries and area. In another embodiment, the boundaries of the object of interest may be outlined with several configurable color options, such as green for an object of interest that is helpful such as a person waving at the user, orange or yellow for an object of interest that is potentially harmful, such as furniture that the user may be approaching, and red for an object of interest to avoid or to be aware of, such as a descending staircase, a fire, a stop sign, etc.

In addition to, or instead of, using cameras, embodiments may retrieve location information on objects of interest from databases, such as architectural databases, crowd-sourced databases, etc.

Embodiments may provide a dynamic solution to continually scan the user's environment for objects of interest, intercept virtual content that may at least partially obscure the objects of interest, and prevent the object of interest from being obscured by the virtual content.

Referring to FIG. 1, a system for dynamic detection and presentation of obscured real-world objects in augmented or mixed reality virtual content is disclosed according to one embodiment. System 100 may include electronic device 110, which may be any suitable electronic device, including smartphones, tablet computers, headsets, eyewear, etc. Electronic device 110 may execute one or more computer programs or applications, including object of interest computer program 112 and/or virtual reality/augmented reality (VR/AR) computer program 118.

In one embodiment, electronic device 110 may include a processing portion (e.g., a server, a computer (e.g., desktop, tablet, notebook)) and a head-worn device, such as a headset, goggles, eyewear, etc. (not shown) that may receive data from the processing portion and display the data on a display.

Electronic device 110 may include camera 114 that may capture an environment in which electronic device 110 is operating. In one embodiment, camera 114 may capture an image of object of interest 140. Object of interest 140 may be any object that should not be obscured by virtual content, including, for example, hazards, hazardous objects, people, animals, signs, etc. In one embodiment, the types of objects that may qualify as objects of interest may be configurable by the user. In another embodiment, the types of objects that may qualify as objects of interest may be defined in a database, such as object of interest database 130.

In one embodiment, electronic device 110 may include one or more sensor(s) that may detect and locate one or more objects of interest 140. Examples of sensors 116 may include LiDAR, Infrared (IR) light, radar. ultrasound, lasers, etc. In one embodiment, object of interest computer program 112 and/or VR/AR computer program 118 may use the location data from sensor(s) 116 to display object of interest 140 in the virtual or augmented reality content.

Object of interest computer program 112 that may receive data for an object and may determine whether the object is an object of interest 140 that should not be obscured. In one embodiment, object of interest computer program 112 may compare image data for an object to data in object of interest database 130 to determine if the object is an object that should not be obscured. In one embodiment, object of interest database 130 may be a commercial database, may be trained for specific objects in an environment, etc.

In one embodiment, VR/AR computer program 118 may cause a display on electronic device 110 to display virtual content, such as furniture, walls, fixtures, staircases, etc. Any type of virtual content may be displayed as is necessary and/or desired.

In one embodiment, AR/VR computer program 118 may interface with object of interest computer program 112 to cause objects of interest 140 so that they are not obscured by the virtual content. Objects of interest 140 may be highlighted or otherwise displayed in a manner so that they are likely to be noticed by the user.

In one embodiment, object of interest computer program 112 may be provided as a plug-in or similar component for AR/VR computer program 118.

Cloud 120 may include cloud data 122 and cloud processing 124. Cloud data 122 may include data about an environment, such as building architecture, streets, etc. In one embodiment, the data may include location data for fixed objects of interest 140, such as stairs, windows, doors, signs, hazards, etc. Cloud data 122 may further include custom data, such as data provided by the user, crowdsourced data, etc. regarding objects of interest.

In one embodiment, the objects of interest in cloud data 122 may be permanent or semi-permanent objects.

Cloud processing 124 may perform at least some of the processing for object of interest computer program 112 and/or VR/AR computer program 118.

Figure 2:
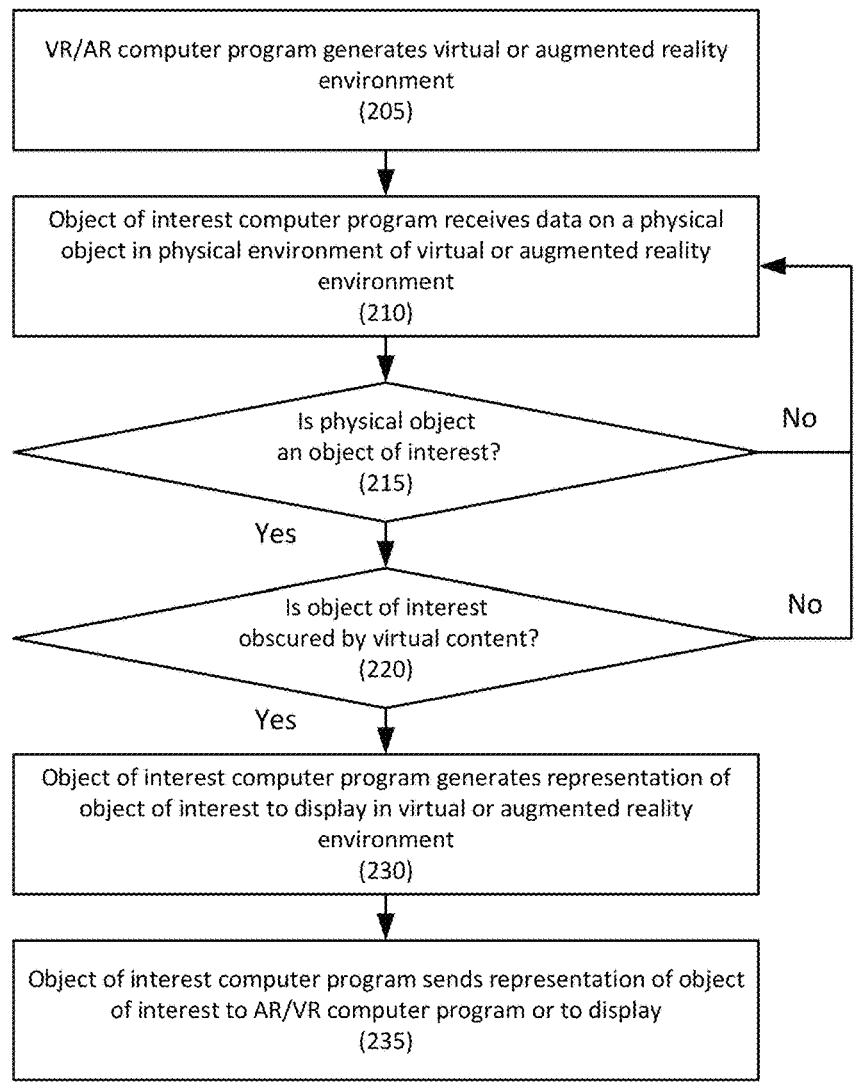
FIG. 2 depicts a method for dynamic detection and presentation of obscured real-world objects in augmented or mixed reality virtual content according to an embodiment.

Referring to FIG. 2, a method for dynamic detection and presentation of obscured real-world objects in augmented or mixed reality virtual content is disclosed according to an embodiment.

In step 205, a virtual reality/augmented reality computer program executed by an electronic device may generate data for a virtual or augmented reality environment to display on a display of the electronic device. In one embodiment, the VR/AR computer program may generate a virtual or augmented reality environment, including one or more virtual object to place in the virtual or augmented reality environment.

In one embodiment, virtual reality/augmented reality computer program may retrieve physical dimensions of an area, permanent or semi-permanent physical objects in an area, etc.

In step 210, an object of interest computer program executed by the electronic device may receive data for one or more physical objects in the environment. In one embodiment, the data may include image data that may include an image of the physical object, position data for the physical object, etc. In one embodiment, the data may be received from a camera, one or more sensor (e.g., LiDAR, IR, sonar, etc.), a database, etc.

In another embodiment, location sensing-technology, such as Light Detection and Ranging (LiDAR) technology, may be used to map and create a three-dimensional model of the object of interest in real time. The three-dimensional model of the object of interest may be place in the virtual content (e.g., in the virtual environment) so that it is displayed in the same position in the virtual content that it exists in the real world.

In one embodiment, the AR/VR computer program may call the object of interest computer program before displaying the virtual environment.

In step 215, the object of interest computer program may determine whether the physical object is an object of interest that should not be obscured by virtual content in the augmented or virtual reality environment and/or highlighted in the augmented or virtual reality environment. In one embodiment, object of interest computer program may compare the data received from the sensor(s) and/or database to data in an object of interest database to identify the object and determine whether it is an object of interest.

If the physical object is determined to be an object of interest, in step 220, the object of interest computer program may determine whether the object of interest is at least partially obscured by virtual content in the augmented or virtual reality environment.

In one embodiment, the object of interest computer program may determine whether the object of interest is at least partially obscured by the virtual content by making a ray cast query from the electronic device. The ray cast query is made from, for example, the electronic device's camera to the object of interest. If the ray cast query returns results indicating that it passed through the virtual content on the way to the object of interest, this indicates the object of interest is at least partially obscured.

For example, in one embodiment, the virtual content may be placed in a space, and an object of interest may be identified within the camera frame. The object of interest computer program may calculate a distance between the electronic device and the object of interest, as well as the distance between the electronic device and the virtual content. The object of interest computer program may then perform a ray cast query to the object of interest to determine if the virtual content was intersected along the ray's path to the object of interest. If it is, then the virtual content is at least partially obscuring the object of interest.

In another embodiment, the object of interest computer program may use per-pixel depth information about the surrounding environment to determine whether the object of interest is at least partially obscured by the virtual content. The per-pixel depth information may be combined with, for example, three-dimensional mesh data, virtual objects may be placed and blended with their physical surroundings. The object of interest computer program may determine whether the object of interest is at least partially obscured using this data.

In one embodiment, the object of interest may always be displayed regardless of whether it is at least partially obscured by a virtual content in the augmented or virtual reality environment. For example, in one embodiment, if the locations of the virtual content and the object of interest cannot be accurately determined, the object of interest may be presented within a bounding box or with similar highlighting and presented on the display, regardless of whether it is at least partially obscured by the virtual content.

In embodiments, the bounding box and/or highlighting may be presented regardless of the relative locations of the virtual content and the object of interest.

If the object of interest is at least partially obscured by virtual content, in step 230, the object of interest computer program may generate a representation of the object of interest to display in the virtual or augmented reality environment. For example, the object of interest computer program may detect the boundaries of the object of interest, and the bounded real-world object of interest, including the area within the boundaries, may be removed from the rendering of the virtual content and/or the virtual content. Thus, the virtual content is modified so that the object of interest is not obscured by the virtual content.

In another embodiment, the object of interest computer program may capture an image of the bounded object, and the image may be overlaid on the virtual content, mapped it to the same area in the image so that the position of the cropped image maps to the location of the object of interest. In this way, the virtual content is not modified; instead, a layer is added on top of the virtual content.

The object of interest computer program may visually highlight the object of interest. The object of interest may be highlighted in several ways, and with several indicators denoting the importance or potential danger to the user. For example, in one embodiment, the boundaries of the object of interest may be "padded" to put some unnatural outline of color between the object of interest and the virtual content. In another embodiment, the boundaries and area within the object of interest may be overlaid with a color to the boundaries and area. In another embodiment, the boundaries of the object of interest may be outlined with several configurable color options, such as green for an object of interest that is helpful such as a person waving at the user, orange or yellow for an object of interest that is potentially harmful, such as furniture that the user may be approaching, and red for an object of interest to avoid or to be aware of, such as a descending staircase, a fire, a stop sign, etc.

In step 235, the object of interest computer program may send the representation of the object of interest to the AR/VR computer program, or to the display. For example, the display may display the representation of the object of interest independently of the augmented or virtual reality environment.

In one embodiment, the AR/VR computer program may display the virtual content with either the object of interest, or a picture of the object of interest. In one embodiment, the display may receive both the AR/VR environment and the object of interest and may display the object of interest as a layer on the AR/VR content.

In step 215, if the object is not determined to be an object of interest, or in step 220, if the object of interest is not obscured by virtual content, the process may return to receiving data on physical object(s) in the physical environment in step 210.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method, comprising:
   receiving, by an object of interest computer program executed by an electronic device, a location for a virtual or augmented reality object to display on an augmented reality view of a physical environment by an augmented reality computer program executed by the electronic device, wherein the augmented reality view comprises a physical object that is fixed in the physical environment;
   generating, by the object of interest computer program, a graphical representation of the virtual or augmented reality object at the location for the virtual or augmented reality object;
   detecting, by the object of interest computer program, the physical object from image data or sensor data received from the electronic device;
   determining, by the object of interest computer program, a location for the physical object in the physical environment from the image data or the sensor data;
   determining, by the object of interest computer program by using the location for the virtual or augmented reality object and the location for the physical object, that the physical object is at least partially obscured by the graphical representation of the virtual or augmented reality object on the augmented reality view of the physical environment displayed on the electronic device;
   generating, by the object of interest computer program, a virtual representation of the physical object; and
   providing, by the object of interest computer program, the virtual representation of the physical object to the augmented reality computer program, wherein the augmented reality computer program is configured to display the virtual representation of the physical object over the graphical representation of the virtual or augmented reality object in the augmented reality view of the physical environment at the location for the physical object.

2. The method of claim 1, wherein the object of interest computer program receives the location for the virtual or augmented reality object from the augmented reality computer program.

3. The method of claim 1, further comprising:
   determining, by the object of interest computer program, that the physical object is an object of interest.

4. The method of claim 1, wherein the physical object comprises a dangerous, hazardous, or harmful object.

5. The method of claim 1, wherein the step of determining, by the object of interest computer program, that the physical object is at least partially obscured by the graphical representation of the virtual or augmented reality object comprises:
   determining that the location of the graphical representation of the virtual or augmented reality object is between the electronic device and the physical object.

6. The method of claim 5, wherein the object of interest computer program determines a location of the physical object using a ray cast query.

7. The method of claim 5, wherein the object of interest computer program determines a location of the physical object using LiDAR.

8. The method of claim 1, wherein the virtual representation of the physical object comprises an image of the physical object.

9. A method, comprising:
   receiving, by an object of interest computer program executed by an electronic device, a location for a virtual or augmented reality object to display on an augmented reality view of a physical environment by an augmented reality computer program executed by the electronic device, wherein the augmented reality view comprises a physical object that is fixed in the physical environment;
   generating, by the object of interest computer program, a graphical representation of the virtual or augmented reality object at the location for the virtual or augmented reality object;
   detecting, by the object of interest computer program, the physical object from image data or sensor data received from the electronic device;
   determining, by the object of interest computer program, a location for the physical object in the physical environment from the image data or the sensor data;
   determining, by the object of interest computer program by using the location for the virtual or augmented reality object and the location for the physical object, that the physical object is at least partially obscured by the graphical representation of the virtual or augmented reality object on the augmented reality view of the physical environment displayed on the electronic device;
   detecting, by the object of interest computer program, a boundary of the physical object; and
   providing, by the object of interest computer program, the boundary of the physical object to the augmented reality computer program, wherein the augmented reality computer program is configured to remove an area within the boundary from the graphical representation of the virtual or augmented reality object, wherein the physical object is visible in the area of the graphical representation of the virtual or augmented reality object.

10. The method of claim 9, wherein the object of interest computer program receives the location for the virtual or augmented reality object from the augmented reality computer program.

11. The method of claim 9, further comprising:
    determining, by the object of interest computer program, that the physical object comprises a dangerous, hazardous, or harmful object.

12. The method of claim 11, wherein the step of determining, by the object of interest computer program, that the physical object is at least partially obscured by the graphical representation of the virtual or augmented reality object comprises:

determining that the location of the graphical representation of the virtual or augmented reality object is between the electronic device and the physical object.

13. The method of claim 12, wherein the object of interest computer program determines a location of the physical object using a ray cast query.

14. The method of claim 12, wherein the object of interest computer program determines a location of the physical object using LiDAR.

15. An electronic device, comprising:

a display;

an object of interest computer program; and a computer processor;

wherein, when executed by the computer processor, the object of interest computer program causes the computer processor to:

receive a location for a virtual or augmented reality object to display on an augmented reality view of a physical environment by an augmented reality computer program executed by the electronic device, wherein the augmented reality view comprises a physical object that is fixed in the physical environment;

generate a graphical representation of the virtual or augmented reality object at the location for the virtual or augmented reality object;

detecting the physical object from image data or sensor data received from the electronic device;

determine a location for the physical object in the physical environment from the image data or the sensor data;

determine that the physical object should not be obscured by identifying a type of the physical object in an object of interest database comprising a plurality of types of physical objects;

determine by using the location for the virtual or augmented reality object and the location for the physical object that the physical object is at least partially obscured by the graphical representation of the virtual or augmented reality object on the augmented reality view of the physical environment displayed on the electronic device;

generate a virtual representation of the physical object; and provide the virtual representation of the physical object to the augmented reality computer program, wherein the augmented reality computer program displays the virtual representation of the physical object over the graphical representation of the virtual or augmented reality object in the augmented reality view of the physical environment at the location for the physical object.

16. The electronic device of claim 15, wherein the object of interest computer program receives the location for the virtual or augmented reality object from the augmented reality computer program.

17. The electronic device of claim 15, wherein the object of interest database comprises physical objects that are dangerous, hazardous, or harmful.

18. The electronic device of claim 15, wherein the object of interest computer program causes the computer processor to determine that the physical object is at least partially obscured by the graphical representation of the virtual or augmented reality object by determining a location of the physical object and determining that the location of the virtual or augmented reality object is between the electronic device and the physical object.

19. The electronic device of claim 18, wherein location of the physical object is determined using a ray cast query.

20. The electronic device of claim 18, further comprising a LiDAR transceiver, and wherein the location of the physical object is determined using LiDAR from the LiDAR transceiver.

* * * * *